Feb. 6, 1968   N. D. DIAMANTIDES   3,367,194
RATE GYROSCOPE

Original Filed Jan. 29, 1962   3 Sheets-Sheet 1

INVENTOR.

Feb. 6, 1968   N. D. DIAMANTIDES   3,367,194
RATE GYROSCOPE

Original Filed Jan. 29, 1962   3 Sheets-Sheet 2

INVENTOR.

Feb. 6, 1968 N. D. DIAMANTIDES 3,367,194
RATE GYROSCOPE
Original Filed Jan. 29, 1962 3 Sheets-Sheet 3

INVENTOR.

United States Patent Office 3,367,194
Patented Feb. 6, 1968

3,367,194
RATE GYROSCOPE
Nick D. Diamantides, 2517 14th St.,
Cuyahoga Falls, Ohio 44223
Continuation of application Ser. No. 169,451, Jan. 29, 1962. This application Feb. 4, 1965, Ser. No. 432,446
29 Claims. (Cl. 74—5.6)

The present invention relates to gyroscopic apparatus which can be utilized in measuring the rate of turn of a support, carrying the apparatus, with respect to an inertial reference system, and in computing various mathematical functions of said rate by means of a feedback arrangement.

This application is a continuation of patent application Ser. No. 169,451 filed Jan. 29, 1962 and now abandoned.

In conventional gyroscope construction, two differing approaches are being utilized both of which suffer from shortcomings inherent to their basic design. The first approach makes use of a relatively massive rotor element which has been subjected to precise dynamic balancing and is mounted on a balanced low-friction system of gymbals allowing a high-speed spin of the mass about a spin axis under the driving influence of an electric or pneumatic motor, and a precession about an output axis normal to the spin axis. Those versed in this art are aware of the extreme care and cost involved in the design, manufacture and maintenance of such gyroscopes to avoid spurious readings and drifts because of static weight, bearing friction, anisoelasticity, windage effects, temperature effects, and lead-wire torques.

The second approach substitutes a liquid mass in place of the aforesaid solid rotor. The liquid occupies either a thin cylindrical annulus or a spherical volume and is forced to rotate rapidly by electromechanical means and develop coriolis forces that are read by means of hydrodynamic pickoffs. Those versed in this art are aware of the fact that devices of this type have insufficient sensitivity and resolution because of the inherent limitations of electrohydraulic instruments. In addition, the presence of liquid members in the signal flow path precludes the application of torque feedback unless unduly complex instrumentation is accepted.

Difficulties of the aforesaid character may be either avoided or vastly overcome in a unique configuration which is the subject of my invention and which avoids hydrodynamic problems and viscous friction variations, insensitizes the device to mechanical friction, loading effects, spurious torques due to material links, crosstalk, and drifts due to aging, and does not necessitate a special rotor-motor construction that represents an expensive design departure from its conventional motor counterpart. My invention accomplishes these tasks by the fact that it comprises a small head driven in rotation around the axis of its shaft and which carries a rate-of-turn sensing rotor, supported on the head by means of torsion springs that permit oscillation of the rotor about an axis normal to the shaft axis, this rotor being combined with sensing means for picking up the rotor pulsation and with electromechanical means for the application of feedback forces on the rotor.

Accordingly, it is one of the objects of the present invention to provide improved gyroscopic apparatus (a) avoiding the foregoing difficulties of viscous friction, gymbal friction, sensor loading, spurious torques, crosstalk and zero drifts; (b) having exceptional signal stability and no uncertainty threshold due to coulomb friction; (c) having exceptional frequency response over a relatively wide range; (d) having no stray output signals due to coupling between the driving motor and pickup fields.

A further object is to provide an instrument having a spinning rate-of-turn sensing element which, when subjected to a rotation $\bar{\omega}_i$ normal to the spin axis, undergoes a sinusoidally modulated mechanical oscillation, the angular frequency of this oscillation being equal to the spin angular velocity, the amplitude of the same oscillation being proportional to a function of the input rate $|\omega_i|$, and the phase angle of this oscillation being independent of the orientation of $\omega_i$ on the plane normal to the spin axis.

It is another object to provide a simplified and accurate gyroscopic apparatus that in combination with highly accurate electromechanical or optical pickoffs is capable of translating the aforementioned mechanical oscillation into two electrical signals, of the same sinusoidal character as the oscillation, representing the components of $\bar{\omega}_i$ along two selected orthogonal axes perpendicular to the spin axis and, thus, make the device a dual-axis rate gyroscope.

A still further object is to provide improved gyroscopic apparatus insensitive to any angular acceleration about the output axis.

Another object of the present invention is to provide a gyroscopic apparatus free of the cross-coupling error otherwise caused by the deflection of the aforesaid sensing element in response to an input rate of turn.

Another object of the present invention is to provide a rate gyroscope operable in a free-of-damping mode and, therefore, free of problems associated with the chemical-stability and viscosity-constancy of damping fluids, insensitive to nuclear radiation effects, and free of spurious torques generated by convection currents in fluids, and of drift and static balance errors due to shifts in the center of bouyancy.

Another object is to provide a gyroscopic instrument with a response which may be rendered free of a transient term and therefore suitable for applications where extreme speeds and violent maneuvers are prevalent.

A further object is to provide a gyroscopic device insensitive to linear accelerations due to vibration or other causes.

An additional object is to provide a gyroscopic device in which null error and drift signals appear at a carrier frequency different from that of the basic output signal and, therefore, readily rejectable.

A still further object of the present invention is to provide improved gyroscopic apparatus having a mechanical rate-of-turn sensing element that can serve concurrently a second important function by becoming a torque feedback member, said feature endowing the apparatus with an extremely flexible input-output characteristic and changing it into a rate integrating gyroscope if so desired.

Other objects are to provide a gyroscopic instrument of small physical size and weight, having low power requirements, featuring extreme structural simplicity, requiring minimum adjustment and checkout time, having long life-expectancy, not affected adversely by rugged handling and hostile environment, and requiring low cost.

These and other objects, as well as a fuller understanding of this invention, may be had by referring to the following description and claims, taken in conjunction with the accompanying drawings, in which:

FIGURE 5b is schematic illustration of the electric circuit of the device in FIGURE 5a.

FIGURES 6, 6b, 6c, 6d, and 6e illustrate various ways of combining the gyroscopic sensor with piezoresistive strain gages.

Figure 1:
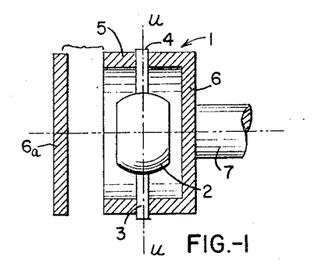
FIGURE 1 illustrates a side view of the rate gyroscope embodying teachings of this invention and showing its basic mechanical configuration in a longitudinal cross section.
Figure 1A:
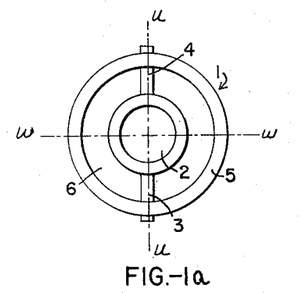
FIGURE 1a illustrates pictorially an end view of the apparatus in FIGURE 1.

Referring to the accompanying drawings and first to FIGURE 1 thereof which illustrates the basic elements of the invention, it will be perceived that a rate-of-turn sensing head 1 includes a rotor 2, the special shape of said rotor being important to the uniqueness of the instrument's performance. The rotor 2 is suspended about an axis of central symmetry by a pair of torsion springs 3 and 4, which in turn are clamped onto the cylindrical rim 5 of the cup-shaped support 6. This support may be capped with a cap 6a (shown removed) to form a closed vessel that may be filled with damping fluid as needed in one embodiment of the invention; the cap 6a may be either metallic or made of a material transparent to light. The support 6 is mounted on a shaft 7 whose axis intersects the aforesaid torsion spring axis at right angles. The shaft 7, and with it the head 1, is adapted to be rotated about its axis, called "spin axis," at a high speed by a synchronous or hysteresis motor (not shown).

Because of the kinematic constraints imposed by the suspension, the only angular motion of import of the rotor 2 relative to the support 6 is a rotation about the torsion spring axis, hereafter called oscillation axis or, alternately, suspension axis; such rotation will be shown to occur only when the device as a whole is subjected to an angular rotation about an axis nonparallel to the spin axis, and to take place against the restoring torsion force or other purposely introduced torques.

Figure 2:
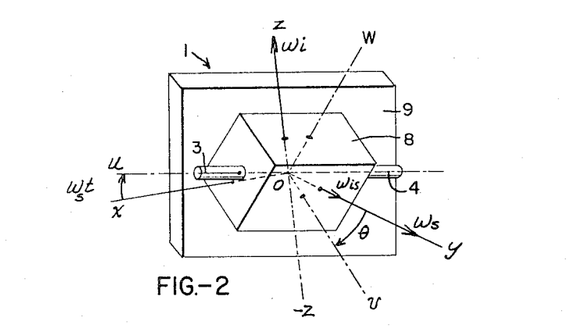
FIGURE 2 is a perspective geometry drawing of the dynamic factors involved in the performance of the device, i.e, the angular speeds, torques, and displacements participating in the rate-of-turn measurement.

In order to explain the emergence of the aforesaid relative motion of the rotor 2 with respect to the support 6, and to compute its qantitative features, reference to FIGURE 2 is necessary. Rotor 2 is shown in FIGURE 1 to be rotationally symmetric about the spin axis. However, to make the analytical derivation clearer, the rotor is pictured in FIGURE 2 as a tube 8 tilted to some degree with respect to the support 9. In compliance with the requirements of gyrodynamics, an orthogonal set of body axes $u, v, w$ is selected centered at the centroid 0 of the cube and parallel to its sides. A similar set of axes $x, y, z$ is visualized affixed on the inertial space and centered also at 0. For convenience, and without any loss of generality, the z-axis of the second set is chosen to coincide with the component $\omega_i$ of the total input angular rate $0_i$ to which the whole device is subjected. Consequently, the orthogonal component $\omega_{is}$ will be directed along the y-axis taken along the spin axis. The first necessary step is to establish the components of the angular velocity of the rotor (cube) 8 about each of the body axes $u, v, w$ in terms of the components of $0_i$ and of the spin velocity $\omega_s$, as well as of the rotor deflection $\theta$ that is due to the gyroscopic forces.

The components in question are $$0_v = (\omega_s + \omega_{is}) \cos \theta - \omega_i \cos (\omega_s + \omega_{is})t \sin \theta$$
$$0_u = \dot{\theta} + \omega_i \sin (\omega_s + \omega_{is})t$$
$$0_w = (\omega_s + \omega_{is}) \sin \theta + \omega_i \cos (\omega_s + \omega_{is})t \cos \theta$$

In practice the spin velocity $\omega_s$ exceeds by far the turning rates of manned and unmanned ballistic vehicles, a fact which justifies the only approximation made in the present analysis; that is, that $\omega_{is}$ can be neglected in the sum $(\omega_s + \omega_{is})$. Thus $$0_v = \omega_s \cos \theta - \omega_i \cos \omega_s t \sin \theta$$
$$0_u = \dot{\theta} + \omega_i \sin \omega_s t$$
$$0_w = \omega_s \sin \theta + \omega_i \cos \omega_i \cos \omega_s t \cos \theta$$

These three components are sufficient to express the total kinetic energy of the rotor 2 as $$T = \tfrac{1}{2}(I_v 0_v{}^2 + I_u 0_u{}^2 + I_w 0_w{}^2)$$

or, by combining the last two systems of equations, as a detailed expression $$T = \tfrac{1}{2}[\omega_s{}^2(I_v \cos^2 \theta + I_w \sin^2 \theta) + I_u \dot{\theta}^2$$
$$+ \omega_i{}^2(I_v \cos^2 \omega_s t \sin^2 \theta + I_u \sin^2 \omega_s t + I_w \cos^2 \omega_s t \cos^2 \theta)$$
$$+ \omega_s \omega_i(I_w - I_v) \cos \omega_s t \sin 2\theta + 2 I_u \dot{\theta} \omega_i \sin \omega_s t]$$

where $I_u, I_v, I_w$ are the moments of inertia of the rotor 8 about the axis $u, v, w$ respectively. If $$I_u = I_v = I_w = I$$

the total kinetic energy equation reduces to $$T = \frac{I}{2}(\omega_s{}^2 + \omega_i{}^2 + 2\dot{\theta}\omega_i \sin \omega_s t + \dot{\theta}^2)$$

However, it should be obvious from the factor $(I_w - I_v)$ in the detailed expression for T that equally satisfactory results are obtained as far as the differential equation of the rotor deflection $\theta$ is concerned, if $$I_v = I_w \text{ and } I_u = I$$

although in this case the total kinetic energy reduces to $$T = \frac{I}{2}\left[\omega_s{}^2 \frac{I_v}{I} + \omega_i{}^2 \left(\frac{I_v}{I} \cos^2 \omega_s t + \sin^2 \omega_s t\right) + 2\dot{\theta}\omega_i \sin \omega_s t + \dot{\theta}^2\right]$$

This is so because, as seen subsequently, the differential equation for $\theta$ depends only on the terms $$2\dot{\theta}\omega_i \sin \omega_s t + \dot{\theta}^2$$

of T and not at all on the terms comprising the squared factors $\omega_s{}^2$ and $\omega_i{}^2$.

It is only the imposition of one or the other condition of equality among the principal moments of inertia of the rotor that makes possible a unique simplification of the equation of motion of the rotor 2 and allows this rotor to move in a manner that yields the measurement of $\omega_i$ without undue computational complexity and without any approximation whatsoever.

With the total kinetic energy known, Langrange's equations of motion, which represent convenient ways of writing Newton's second law, can be readily derived. In terms of generalized coordinates and for a mechanical system such as the present where there may exist an external moment, namely viscous drag, non-derivable from the potential energy V of the system, these equations are $$\frac{d}{dt}\left(\frac{\partial T}{\partial \dot{q}_i}\right) - \frac{\partial T}{\partial q_i} = -\frac{\partial V}{\partial q_i} - Q_i$$

In this expression the potential energy function depends only on the position coordinates $q_i$ of the rotor but not on the velocity coordinates $\dot{q}_i$. Specifically, in the case of the rotor 8 suspended in the aforementioned manner, $q_i = \theta$; hence, the potential energy storage is effected through the spring force $k\theta$, and the dissipative moment is effected through the viscosity term $c\dot{\theta}$. Consequently $$\frac{d}{dt}\left(\frac{\partial T}{\partial \dot{\theta}}\right) - \frac{\partial T}{\partial \theta} = -k\theta - c\dot{\theta}$$

In this expression $k$ is the coefficient of elastic restraint in dynecentimeters per radian, and $c$ is the coefficient of viscous damping in dyne-centimeter-seconds, provided that $\theta$ is expressed in radians, $\omega_s$ and $\omega_i$ in radius per second, and I in dyne-centimeter-seconds squared.

Combination of the last two equations with either one of the expressions for T results in $$\ddot{\theta} + 2\xi\omega_n\dot{\theta} + \omega_n^2\theta = -\frac{d}{dt}(\omega_i \sin \omega_s t)$$

where the undamped natural frequency $\omega_n$ and the damping ratio $\xi$, characteristic of a second order system, are defined as $$\omega_n = \sqrt{\frac{k}{I}} \text{ rad./sec.}$$

$$\xi = \frac{c}{2\sqrt{kI}}$$

This formula will be referred to as the "basic response equation" of the present gyroscope, and may be conveniently expressed in terms of its Laplace transform in the form $$\theta(s) = \frac{1}{s^2 + 2\xi\omega_n s + \omega_n^2}(\alpha[\omega_i\omega_s \sin \omega_s t] - \alpha[\dot{\omega}_i \cos \omega_s t])$$

where $s$ is the Laplace operator, and where it is assumed that $$\left.\begin{array}{l}\theta = 0 \\ \dfrac{d\theta}{dt} = 0\end{array}\right\} \text{when } t = 0$$

The basic response equation is an excellent means of judging the performance of the present gyro, because it yields readily the response of the device to either one or two standard test input rates, namely, the constant rate, or step, and the simple periodic rate.

For the step input rate, $\omega_i$ rad./sec. constant, and $\dot{\omega}_i = 0$. Hence, $$\theta(s) = \frac{\omega_i \omega_s^2}{(s^2 + 2\xi\omega_n s + \omega_n^2)(s^2 + \omega_s^2)}$$

The solution of this equation in the time domain is $$\theta(t) = \frac{\omega_i\omega_s}{[(\omega_n^2 - \omega_s^2)^2 + (2\xi\omega_n\omega_s)^2]^{1/2}} \sin(\omega_s t - \psi_1) + \frac{\omega_s}{\omega_n\sqrt{1-\xi^2}} \epsilon^{-\xi\omega_n t} \sin(\omega_n\sqrt{1-\xi^2} t - \phi_2)$$

where $$\psi_1 = \tan^{-1} \frac{2\xi\omega_n\omega_s}{\omega_n^2 - \omega_s^2}$$

$$\psi_2 = \tan^{-1} \frac{-2\xi\omega_n\sqrt{1-\xi^2}}{\omega_s^2 - \omega_n^2(1-2\xi^2)}$$

The first sinusoid term, named $\theta_{st}$, within the bracket of the right-hand member represents the steady state part of the solution, while the second term describes the transient response which eventually dies out.

For the periodic input having a maximum amplitude $\omega_{i0}$ and a period $\omega_o$ the response can be found by substituting $\omega_i = \omega_{i0} \cos \omega_o t$ in the basic equation. Thus $$-\frac{d}{dt}[\omega_i \cos \omega_s t] = -\frac{d}{dt}[\omega_{i0} \cos \omega_o t \cos \omega_s t] =$$

$$\frac{\omega_{i0}}{2}[(\omega_s + \omega_o) \sin(\omega_s + \omega_o)t + (\omega_s - \omega_o)\sin(\omega_s - \omega_o)t]$$

Consequently, in operational form $$\theta(s) = \frac{\omega_{i0}}{2}\frac{(\omega_s + \omega_o)^2}{(s^2 + 2\xi\omega_n s + \omega_n^2)[s^2 + (\omega_s + \omega_o)^2]} + \frac{(\omega_s - \omega_o)^2}{(s^2 + 2\xi\omega_n s + \omega_n^2)[s^2 + (\omega_s - \omega_o)^2]}$$

Assuming that $\omega_o \ll \omega_s$ and $\omega_o$ in the time solution except in the argument of the trigonometric terms, where the familiar trigonometric identities for a sum and a difference may be applied, will lead to the solution $$\theta(t) = \frac{\omega_{i0}\omega_s}{[(\omega_n^2 - \omega_s^2)^2 + (2\omega_n\omega_s)^2]^{1/2}}[\sin(\omega_s t - \psi_1) \cos \omega_o t + \frac{\omega_s}{\omega_n\sqrt{1-\xi^2}}\epsilon^{-\omega_n t \xi}\sin(\omega_n\sqrt{1-\xi^2} - \psi_2)]$$

where the values of the phase angles $\varphi_1$ and $\varphi_2$ are the same as in the previous case.

The results of the aforementioned cases indicate that the absolute value of the present gyroscope's mechanical gain factor is $$A = \frac{\theta_{st}}{\omega_i} = \frac{\omega_s}{[(\omega_n^2 - \omega_s^2)^2 + (2\xi\omega_n\omega_s)^2]^{1/2}}$$

If the rotor 2, FIGURE 1, is so constructed and suspended as to make its natural angular frequency $\omega_n$ equal to the spin velocity $\omega_s$, the gain factor becomes equal to $$A = \frac{1}{2\xi\omega_s}$$

and the phase angle reduces to $$\psi_1 = \frac{\pi}{2}$$

that is, in this case the phase angle is independent of the coefficient of damping It will be appreciated that the foregoing analytical results predict several significant properties of the new instrument; namely, (a) that when the instrument is subjected to a rotation rate $\omega_i$ about an axis normal to the spin axis, the rotor 2 undergoes a steady oscillatory motion $\theta_{st}$ about its oscillation axis; (b) that the angular frequency of this oscillation is equal to the spin angular velocity; (c) that the amplitude of the oscillation is proportional to the input rate of turn; (d) that the output lags behind the input by a phase angle independent of the orientation of $\omega_i$ in the spin plane; (e) that cross-coupling between input and output axes does not exist since, on account of the radial symmetry of the rotor 2, the inertia of the rotor about the spin axis remains unalterable in spite of the deflection $\theta$; (f) that an angular acceleration about the output axis is no longer a source of error, because it represents only a rate of change of $\omega_i$ and, therefore, is part of the time variation of the input rate.

However, the instrument is capable of an additional and most important mode of functioning that derives from the fact that the device is an oscillatory mechanism per se and, therefore, that the "ringing" response of an underdamped second order system to a step input is of no consequence here. Thus, removal of the viscous damping, and exercise of design care to keep the rotor oscillation within the limits required to render the internal friction in the torsional springs insignificant, make $\xi = 0$ and change the basic response equation to $$\theta(s) = \omega_i \frac{\omega_s^2}{(s^2 + \omega_n^2)(s^2 + \omega_s^2)}$$

The inverse transform of this expression is $$\theta(t) = \omega_i \frac{\omega_s}{\omega_n(\omega_s^2 - \omega_n^2)} \cdot [\omega_s \sin \omega_n t - \omega_n \sin \omega_s t]$$

Designation of the ratio of the two frequencies as $$\omega_n/\omega_s = \gamma$$

along with a selective rejection of the term $\sin \omega_s t$ through filtering reduces the response expression to $$\theta(t) = \omega_i \frac{1}{\omega_n(1-\gamma^2)} \sin \omega_n t$$

This makes the mechanical gain factor $$A = \frac{1}{\omega_n(1-\gamma^2)}$$

It will be appreciated that this dampless mode of operation entails a number of significant characteristics, namely, (a) that there is no transient term present in the response of the instrument, a fact which certainly favors the instrument in applications where extreme speeds and violent maneuvers are prevalent; (b) that the signal peak occurs exactly at the point where the sensor torsion axis is normal to $\omega_i$, without a phase shift; (c) that the device becomes free of problems of chemical-stability and viscosity-constancy associated with damping fluids, particularly in the presence of nuclear radiation or temperature variations; (d) that, in absence of damping fluids, spurious torques generated by convection currents, hydrostatic balance errors, and shifts in the center of buoyancy are eliminated.

It will be further appreciated that in either the damped or undamped mode of operation the possibility exists that the rotor 2, FIGURE 1, is originally set so that in its undisturbed position (i.e., when $\omega_i=0$) its body axis Ov does not coincide exactly with the corresponding inertial axis Oy. Such discrepancy, $\theta_e$ although minute, is almost unavoidable in precision mechanical work. It is also possible that the discrepancy is not the result of original erroneous setting but of drifts during the instrument's life because of metal aging or other causes. However, it is obvious from the foregoing analysis that this discrepancy is of no consequence whatsoever to the accuracy of the instrument because the signal of interest $\theta(t)$, calculated previously, is a sinusoidal deflection of angular frequency $\omega_s$ superimposed additively to the deflection $\theta_e$ which is either constant or drifts at a much slower rate (by a factor of about one million). Hence, another significant property of the present gyroscope is that the null error and drift signals appear at a carrier frequency different from that of the legitimate signal and can be readily rejected.

At this point it becomes apparent that in order to pick up the deflection $\theta$ of the rotor 2 with respect to the support 6, that is to say the angular deviation of the rotor from its undisturbed position, a pickoff is necessary. It will become apparent shortly that a presentation is needed of the pertinent characteristics of pertinent types of pickoffs to a degree of detail sufficient to illustrate how the combination of the head 1 with members of such pickoffs results in novel embodiments of the gyroscopic features of the present invention.

Figure 3:
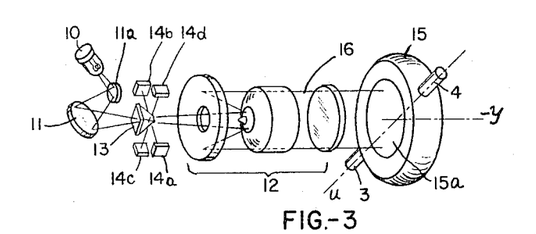
FIGURE 3 is a schematic diagram of the principal elements of the present invention coupled to a reflective optical pickoff.

The workings of the first such pickoff are illustrated in FIGURE 3 in relationship to the gyroscopic head of the present invention. This pickoff includes a microlamp incandescent light source 10, source condenser mirrors 11a, 11b; reflective optics in the form of a compound subjective lens 12; a truncated sensing prism 13; and four lead-sulfide photodetectors 14a, 14b, 14c, 14d placed at the four cardinal points of the orthogonal reference system Oxz affixed on the instrument case. Light is reflected from the mirror-polished portion 15a of the surface of the gyro rotor 15 normal to the spin axis. It will be appreciated that when the rotor 15 deflection $\theta$ is zero the reflected light passes entirely through the clear nose of the sensing prism 13. Any spillover is equally divided between the two photodetectors 14a and 14b or 14c and 14d serving each sensing axis Ox or Oy. When deflection occurs, the surface is no longer normal to the optical axis; some light falls on the sides of sensing prism 13 and is reflected into the photodetectors. The resultant unequal distribution of light between the two members of each photodetector pair gives rise to two electrical signals that are proportional to the components of the deflection $\theta(t)$ in the planes Oxy and Ozy which, in turn, are proportional to the components of the input rate-of-turn $\omega_i$ along the axes Ox and Oz respectively. The arrangement is sensitive enough to yield an electrical output of about one-half millivolt per second of arc. In addition to this high sensitivity, those versed in this art will appreciate the fact that if provision is made to collimate the parallel light beam 16 into a cross section smaller than the size of the reflective portion 15a of the side of the rotor 15 any spurious translations of the rotor in the direction of one or all the axes, x, y, z will not have deleterious effects upon the output signals, because such translations of gyroscopic sensors always occur caused (a) by external vibrations of the gyro support, (b) by vibration of the rotor 15 itself on account of the gravitational or other accelerative fields acting upon a minute unbalanced mass in the rotor.

Figure 4:
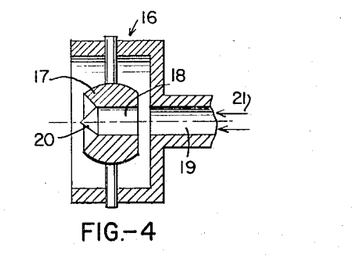
FIGURE 4 illustrates the combined function of the principal element of the invention in conjunction with an optical component that couples optically said element with a refractive pickoff.
Figure 4A:
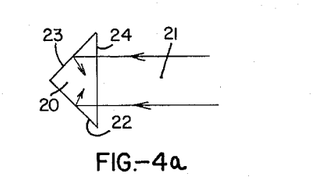
FIGURE 4a illustrates the geometrical optics involved in the workings of the aforesaid refractive pickoff.

The second pickoff arrangement is illustrated in FIGURE 4 as an integral part of the head 16. In this arrangement the rotor 17 has a central hole 18 in the direction of the spin axis, aligned with a hole 19 of the shaft. The hole 18 encloses an optical plug shaped into a prism 20. Collimated light 21 brought through the holes 19 and 18 strikes on the sides of the prism 20. As shown in FIGURE 4a the isosceles angle 22 between each face 23 and the base 24 of the prism is made equal to the critical angle of the plug material, causing virtually all of the normally (to the base 24) incident light to strike the faces of the prism at the critical optical angle and thus be totally reflected internally. An arrangement of four photodetectors (not shown) similar to the one in FIGURE 3 is used to detect light emerging in the direction of each photodetector pair. Chromatic and diffraction effects cause a small amount of light to refract through the prism faces and excite the opposite photocells, but since these effects are symmetric the net output signal per photodetector pair is zero. When, because of the rotor deflection $\theta$, the light beam enters the base of the prism at an angle different than zero one of the refracted rays is strengthened because the incidence angle at the corresponding prism face is less than the critical angle. At the same time, the ray from the opposite face is weakened because its incidence angle is greater than the critical. The net result is a difference in light output that increases as $\theta$ increases and this is reflected in the photodetector output. It will be appreciated that because the cross section of the plug 20 is made smaller than the cross section of the collimated light beam piped through hole 19 the aforementioned spurious translational motions of the rotor 17 do not generate any error signals.

Figure 5:
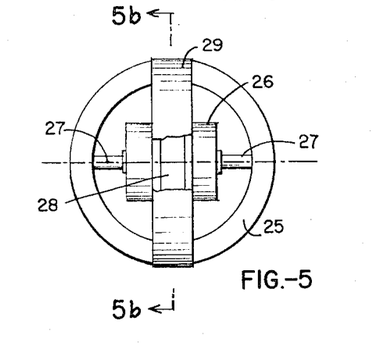
FIGURE 5 is an end view of the embodiment of the gyroscopic sensor into the moving member of electromagnetic pickoff.
Figure 5A:
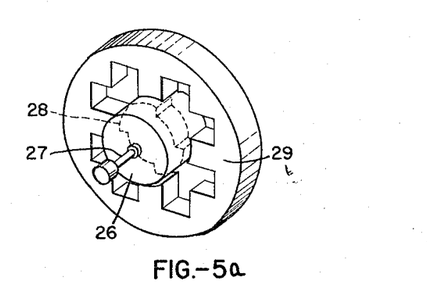
FIGURE 5a is a perspective view of the magnetic circuit of the apparatus in FIGURE 5.
Figures 5B, 6:
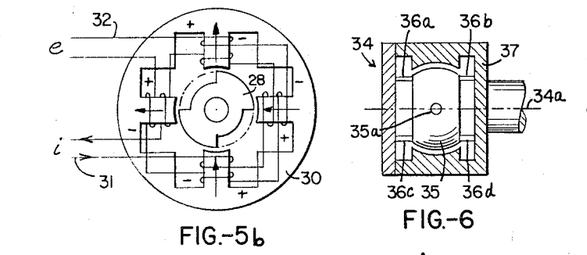

A third pickoff arrangement is illustrated in FIGURES 5 and 5a whereby the rate-of-turn sensing head 25 of this invention has its rotor 26 made in the form of a cylinder of nonmagnetic material held onto the torsion springs 27 except for a slice 28 in the middle of it, shaped as shown and made of laminated high permeability magnetic steel high temperature bonded. This slice heretofore called "the armature" is the rotary part of a microsyn sensor the stator being 29. Only the stator, rotor and spring are shown in FIGURE 5a in perspective, excised from the head 25. The microsyn sensor is functionally analogous to a circular differential transformer, or to a variable reluctance balanced-bridge generator. As shown in more detail in FIGURE 5b, the stator 30 is a four-pole arrangement excitable by the alternating current flowing in the reference winding 31 that establishes the magnetic flux directions indicated in FIGURE 5b. A voltage is induced in each of the four secondary coils of the microsyn output winding 32 proportional to the time rate-of-change of flux in the coils. For the position of the rotor 28 shown equal flux links the four secondary coils and, since two secondary coils are aiding and two are bucking, the induced voltages cancel each other. If the rotor moves clockwise, however, then the magnetic flux increases in the path of two diametrically opposite poles and decreases in the path of the two other poles, the net result being an output voltage proportional to the angle turned. This angle is the deflection $\theta$ arising from the input rate-of-turn $\omega_i$. A phase reversal occurs as the rotor 28 goes through the null position, thus providing information about the direction the rotor has been deflected. The microsyn output voltage, $e$, after demodulation is proportional to the excitation current in the reference winding 31, to the excitation frequency, and to the angle of deflection $\theta$ of the rotor 28. More precisely, the output of an A.C. excited microsyn for the steady state component of its rotor position $\theta$ is the derivative of the product of two sinusoids. This results in a suppressed-carrier, amplitude-modulated voltage output of unequal sidebands in accordance with the following equation $$e = Ki\frac{d}{dt}\{[\theta_e + \omega_i A(\sin \omega_n t - \gamma \sin \omega_s t)] \sin \omega_p t\}$$

where K mv./ma./rad./sec. is the electromechanical constant associated with the magnetic paths, $i$ is the excitation current in ma., $\omega_p$ is the angular frequency of excitation in rad./sec., A is the aforementioned gain factor, $\gamma$ the ratio $\omega_n/\omega_s$, and $\theta_e$ the aforementioned null error.

Performing the differentiation and use of the familiar trigonometric expressions for the product of two sinusoids yields $$e = Ki\omega_p\theta_e \cos \omega_p t + \omega_i B\left[\left(1+\frac{\omega_n}{\omega_p}\right)\sin(\omega_n \omega_p)t\right.$$
$$+\left(1-\frac{\omega_n}{\omega_p}\right)\sin(\omega_n-\omega_p)t - \gamma\left(1+\frac{\omega_s}{\omega_p}\right)\sin(\omega_s+\omega_p)t$$
$$\left.-\gamma\left(1-\frac{\omega_s}{\omega_p}\right)\sin(\omega_s-\omega_p)t\right]\text{mv.}$$

where $$B = \frac{Ki\omega_p}{2\omega_n(1-\gamma^2)} \text{ mv./rad./sec.}$$

The above output assumes a very simple form if the excitation frequency is made equal to the spin frequency $$\omega_p = \omega_s$$

which yields $$\frac{\omega_n}{\omega_p} = \gamma$$

Then $$e = Ki\omega_p\theta_e \cos \omega_p t + \omega_i B[(1+\gamma)\sin(\omega_n+\omega_s)t + (1-\gamma)\sin(\omega_n-\omega_s)t - 2\gamma \sin 2\omega_s t]$$

Thus, the electrical output contains, besides the true signal, an excitation frequency component proportional to the null error $\theta_e$. This, however, may be filtered out easily considering that the signal frequency is twice the null-error frequency. The same is true about the two sidebands $$(\omega_n + \omega_s) \text{ and } (\omega_n - \omega_s)$$

As a consequence $$e = \omega_i C \sin 2\omega_s t \text{ mv.}$$

where $$C = -\frac{Ki}{1-\gamma^2} \text{ mv./rad./sec.}$$

The significant outcome of such processing is: that the null errors and drift become of no consequence, and that slight variations in the mechanical resonance frequency have no deleterious effects.

A fourth type of pickoff arrangement is illustrated in FIGURE 6 whereby the rate-of-turn sensing head 34 of this invention has its rotor 35 cemented to one or two pairs of semiconductor strain gages 36a, 36b, 36c 36d, and the other end of each gage being attached to the support 37. All strain gages are placed on the plane that contains the spin axis 34a and is normal to the torsion spring axis 35a.

Figure 6A:
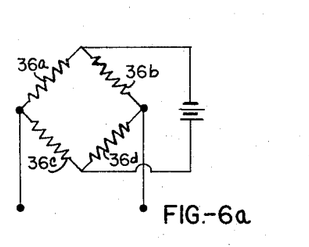
FIGURE 6a is a circuit diagram illustrating the electrical connection of the aforesaid strain gages.
Figure 6B:
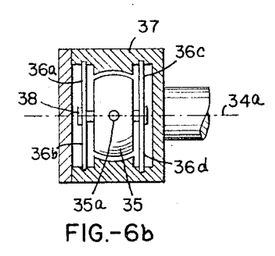
Figure 6C:
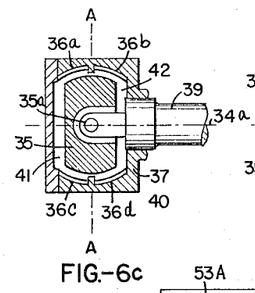
Figure 6D:
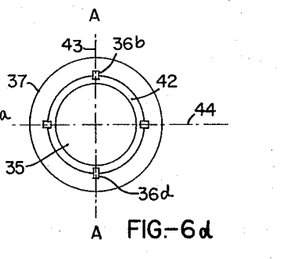
Figure 6E:
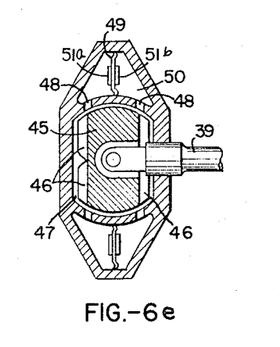

Such gages exhibit piezoresistive properties in that their electrical resistance changes with applied stress. The relative resistance change is negative for compression and positive for tension. As a consequence if the four strain gages are selected to have matched characteristics, and are connected so that they form the balanced bridge shown in FIGURE 6a the bridge output voltage will be proportional to the rotor deflection $\theta$. As in the microsyn type pickoff slip rings (not shown) are necessary to connect the bridge supply to the bridge and to bring the output voltage out of the rotating head 34. The strain gage arrangement is not limited to the one shown in FIGURE 6 but may take any convenient form obvious to those versed in this art, such as: (a) the arrangement shown in FIGURE 6b, whereby a pin 38 affixed at the center of the rotor 35 serves to fasten the one end of each gage 36a, 36b, or 36c, 36d, of a pair of gages, the other end being fastened on the support 37; (b) the arrangement shown in FIGURES 6c, 6d whereby the rotor 35 is formed into a hollow body held onto the support 37 by means of a torsion bar 35a centrally located inside said rotor and normal to the shaft 39 of the rate-of-turn sensing head 40; a hermetically sealed vessel 41 containing a fluid of appropriate viscosity encloses said rotor and support allowing said head to spin freely at a high speed; upon deflection of the rotor on account of the gyroscopic forces the viscous drag developed in the narrow spherical gap 42 between said rotor and vessel stresses the two pairs of gages 36a, 36b, and 36c, 36d located along diametrically opposite arcs of a meridian 43 of the inner surface of the vessel, said gages being free to contract or expand longitudinally without undue friction, and electrically connected into a bridge exactly as in FIGURE 6a; the four similar gages of a second bridge are placed in the plane of a second meridian 44 normal to the plane of meridian 43; thus, the rates-of-turn about two axes are measured. A significant feature of this arrangement is the elimination of slip rings since the gages are stationary. A further valuable feature is that the drag force stressing the gages is proportional to the damping ratio $\xi$ that appears in the basic response equation; hence, its presence in the gain factor $A = 1/2\xi\omega_n$, for the case $\omega_n = \omega_s$, is cancelled in the electromechanical link of the transducer and therefore the disturbing effects of temperature variation upon damping are overcome. (c) The arrangement shown in FIGURE 6e whereby the rotor 45 is equipped with radial fins 46 over both its faces said fins forcing the damping fluid toward the periphery of the containing vessel 47 because of the centrifugal force. As the rotor tilts on account of the deflection $\theta$, it varies the openings of a pair of ducts 48 in such a way that differential pressure proportional to $\theta$ develops across the diaphragm 49 that partitions the hydraulic chamber 50 and causes the diaphragm to deflect; this deflection is sensed by two piezoresistive gages 51a, 51b affixed on either side of the diaphragm. These gages along with those of an identical arrangement at the diametrically opposite side of the vessel are connected into a bridge as in FIGURE 6a, the output of which corresponds to one of the two components of $\omega_i$. An exactly similar array of two hydraulic chambers exists perpendicular to the one shown in FIGURE 6e to read the second component of $\omega_i$.

Semiconductor gages, as used in the aforesaid arrangements, are made primarily of chemically inert silicon exhibiting large piezoresistance effects along specific crystallographic axes. The mechanical properties of these gages are somewhat like those of quartz; silicon does not deform plastically below 1000° F. and its single crystals have nearly perfect elastic behavior and essentially no hysteresis; hence, single crystal gages feature extremely repeatable performance and can be made quite small (0.10 inches). Temperature effects are readily compensated. It is obvious that in the cases of the semiconductor gage pickoffs the electromechanical feedback means illustrated in FIGURE 7 are readily applicable although not shown in FIGURES 6, 6b, 6c, 6d, 6e.

Figure 7:
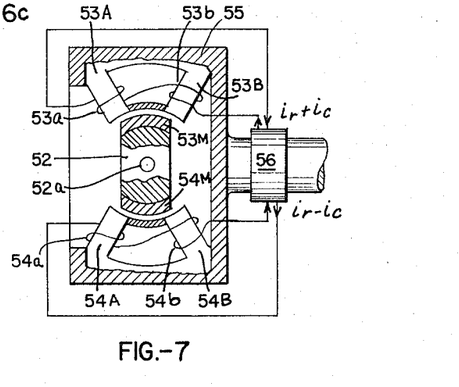
FIGURE 7 is a diagrammatic view of the device including electromagnetic means by means of which electrical feedback signals bring to bear purposeful forces on the sensing element.

Shown in FIGURE 7 are means for the application of feedback torques on the gyro rotor 52, said means called a "torquer" heretofore. The torquer is an electromagnetic variable reluctance device that produces an output torque about the torsion spring axis 52a proportional to the product of a control current $i_c$ and a reference current $i_r$. The two alternating curernts are combined into two sums, $(i_r+i_c)$ and $(i_r-i_c)$, and fed to the pairs of coils 53a, 53b, and 54a, 54b that are wound, as shown in FIGURE 7, on the poles 53A, 53B and 54A, 54B respectively. The poles are part of magnetic circuits made of laminated high permeability magnetic steel high temperature bonded. Facing the magnetic circuits are the similarly constructed magnetic armatures 53M, 54M that are imbedded rigidly into the outer face of the rotor 52. The coils (and the magnetic circuits), being integral parts of the head 55, are connected to the respective current sources (not shown) by means of a slip ring commutator 56 preferably of the mercury-contact type. Because of the aforesaid currents, the poles 53A, 53B produce a clockwise torque on the rotor which is proportional to $(i_r+i_c)^2$ and the poles 54A, 54B exert a counterclockwise torque proportional to $(i_r-i_c)^2$. The net result will be a clockwise magnetic reluctance torque on the rotor equal to $$m=\frac{K_o}{4}[(i_r+i_c)^2-(i_r-i_c)^2]=K_o i_r i_c \text{ dyne cm.}$$

where $K_o$ dyne cm./ma.$^2$ is the electromechanical constant of the torquer. The torque may be made independent of the angular position $\theta$ of the rotor 52 over a prescribed operating range. Furthermore the same torque is proportional to the in-phase component of the currents. We choose to make $$i_r=I_r \sin(\omega_p t+\delta)=(I_r \cos \delta) \sin \omega_p t+(I_r \sin \delta) \cos \omega_p t$$

$$i_c=I_c \frac{d}{dt}(\theta \sin \omega_p t)=(I_c \dot\theta) \sin \omega_p t+(I_c \omega_p \theta) \cos \omega_p t$$

where $\omega_p$ is the angular frequency of the currents exciting the torquer. Combining of the last three equations and taking into account only the in-phase components result in $$m=K_o I_c I_r[\dot\theta \cos \delta+\theta \omega_p \sin \delta]$$

Since this additional torque is applied on the rotor in the proper direction, the basic response equation becomes $$\ddot\theta+2\xi\omega_p\dot\theta+\omega_n^2\theta=-\frac{d}{dt}(\omega_i \sin \omega_s t)$$
$$+\frac{K_o I_c I_r}{I}[\dot\theta \cos \delta+\theta\omega_p \sin \delta]$$

Now selecting the design parameters so that $$2\xi\omega_n=\frac{K_o I_c I_r}{I}\cos \delta$$

$$\omega_n^2=\omega_p \frac{K_o I_c I_r}{I}\sin \delta$$

or $$\frac{\omega_n}{\omega_p}=2\xi \tan \delta$$

changes the aforesaid differential equation to $$\ddot\theta=-\frac{d}{dt}(\omega_i \sin \omega_s t)$$

or $$\theta(t)=(\theta_e+\dot\theta_e)-\int_0^t \omega_i \sin \omega_s t\, dt$$

Since $\theta_e$ is assumed practically time invariant the term $(\theta_e+\dot\theta_e)$ is effectively a constant and the device becomes equivalent to a rate integrating gyroscope.

In a like manner if the torquer currents are chosen so that $$i_r=I_r \cos \omega_p t$$
$$i_c=I_c\theta \cos \omega_p t$$

the feedback torque becomes $$m=K_o I_c I_r \theta$$

which used in the dampless mode of the basic response equation yields $$\ddot\theta+\omega_n^2\theta=-\frac{d}{dt}(\omega_i \sin \omega_s t)+\frac{K_o I_c I_r}{I}\theta$$

This in turn becomes $$\ddot\theta=-\frac{d}{dt}\omega_i \sin \omega_s t$$

if the design parameters are chosen so that $$\omega_n^2=\frac{K_o I_c I_r}{I}$$

Hence, in its dampless mode also the device becomes a rate integrating gyro through torque feedback. It should be pointed out that while the electromagnetic feedback means are shown in FIGURE 7 placed radially relatively to the head, this is not the only position possible, but said means may also be placed parallel to the spin axis.

Figure 7A:
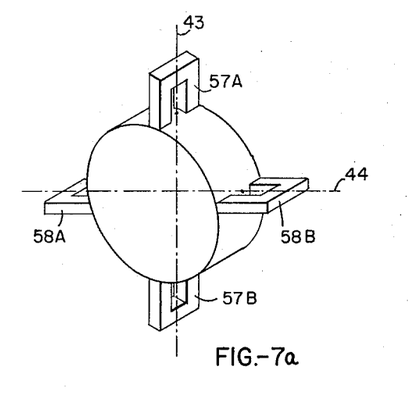
FIGURE 7a a perspective view of an arrangement whereby the means of FIGURE 7 are made stationary instead of spinning with the gyroscopic element.

The electromagnetic feedback means illustrated in FIGURE 7 are an integral part of the gyro head and rotate with it. However, said means may be removed from the rotating head and placed on the perimeter of the vessel containing the head as shown in FIGURE 7a. To this end, two identical such feedback arrangements are required, 57A, 57B, and 58A, 58B placed normal to each other exactly as the photodetectors of the optical pickoff arrangements in FIGURES 3 and 4, or the strain gages in FIGURE 6c, or the hydraulic diaphragms in FIGURE 6e. Each said arrangement will be fed by the output signal of the corresponding photodetector or strain gage bridge after this signal has been properly amplified. It will be obvious to those who are versed in this art that the combined torque generated by the two feedback arrangements will be a vector parallel to, and rotating with, the torsion spring axis of the rotor as required by the basic response equation.

Figure 8:
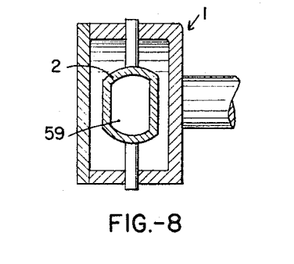
FIGURES 8, 8a illustrate a version of the gyroscopic sensor endowed with internal viscous damping features.
Figure 8A:
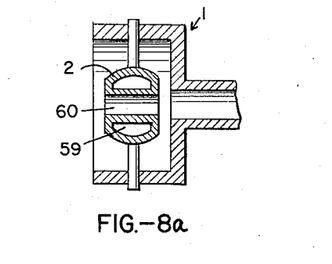

In all the aforesaid embodiments of this invention, the viscous damping acting (when necessary) upon the rotor 2 was applied externally to the rotor through an appropriate liquid contained within the head 1 forming a closed vessel. FIGURE 8 shows means of generating damping within the rotor 2 by providing said rotor with a symmetric cavity 59 filled with a fluid of the appropriate viscosity. FIGURE 8a shows another configuration of said cavity, allowing for a central hole 60 for the passage of a beam of light for the case of optical pickoffs.

It should be obvious to those skilled in the art that the essence of my invention is a solid rotor properly shaped to have at least two, of its three, moments of inertia about two principal axes equal to one another, and that said rotor is suspended through resilient means so that the third principal axis coincides with the spin vector. Furthermore, that said rotor should be enclosed within the cavity of a container which I choose to call "head," said head serving to support either the pickoff elements or the feedback elements, or both. To endow said rotor with the desirable gyroscopic properties it is necessary to impart a high rate of spin to said rotor through said resilient means. The manner in which said spin is transferred from the prime mover (shaft) to said resilient means depends entirely upon the particular combination of pickoff and feedback elements. Thus said rotor is coupled to said shaft either directly through the simple link of said resilient means, as in the case illustrated by FIGURE 6c, or indirectly through the compound link of said resilient means and head taken together as in FIGURE 1. My invention therefore is based on a solid rotor linked resiliently and directly or indirectly with a spinning shaft and shaped to exhibit equal moments of inertia about at least two principal axes, the third principal axis coinciding with the vector of said spin.

Although this invention has been described in terms of certain representative embodiments, it will be apparent to those skilled in the art that various changes and modifications may be made therein without departing from the spirit or scope of the invention.

What is claimed is:

1. Apparatus responsive to angular movement, said apparatus comprising a rotatable head, means for spinning said head through a shaft at a high angular speed about a spin axis, a solid rotor carried on said head, said rotor being mounted for oscillatory movement with respect to said head through resilient means, said resilient means resisting but not impeding gyroscopically induced movements of said rotor with respect to said head about an oscillation axis orthogonal to said spin axis upon occurrence of relative angular movement of said apparatus about an axis normal to said spin axis, said resilient means connecting said rotor to said head, said rotor having one of its three principal axes of inertia aligned with said spin axis and a second of said principal axes aligned with said oscillation axis, said rotor being purposely shaped to exhibit equal moments of inertia about at least two of said principal axes, said two axes being both orthogonal to said oscillation axis.

2. Apparatus responsive to angular movement, said apparatus comprising a rotatable head, means for spinning said head through a shaft at a high angular speed about a spin axis, a solid rotor carried on said head, said rotor being mounted for oscillatory movement with respect to said head through resilient means, said resilient means resisting but not impeding gyroscopically induced movements of said rotor with respect to said head about an oscillation axis orthogonal to said spin axis upon occurrence of relative angular movement of said apparatus about an axis normal to said spin axis, said resilient means connecting said rotor to said head, said rotor having one of its three principal axes of inertia aligned with said spin axis and a second of said principal axes aligned with said oscillation axis, said rotor being purposely shaped to exhibit equal moments of inertia about all three said principal axes.

3. The apparatus of claim 2 in which said head is shaped into a liquid-tight enclosure filled with a damping fluid exerting viscous forces upon said rotor through its external surface.

4. The apparatus of claim 3 in which said rotor is made of nonmagnetic material and includes a magnetic body which comprises the armature of an electromagnetic pickoff, said pickoff also comprising a stator, and an electrical circuit, said circuit translating the gyroscopic movement of said rotor into an electrical signal.

5. The apparatus of claim 2 in which said rotor encloses a hollow liquid-tight cavity containing a damping fluid for exerting viscous forces upon said rotor through its internal surface.

6. The apparatus of claim 5 in which said rotor has a free flat face perpendicular to said spin axis when said rotor is not subjected to forces other than the ones generated by said spin, said free face having its central area formed into a mirror of any appropriate shape for the purpose of reflecting a light beam.

7. The apparatus of claim 5 in which there is provided a light source, said shaft having a central hole along its axis, and said rotor also having a hole that is an extension of said shaft hole, for the purpose of allowing the unobstructed passage of a beam of light from said light source.

8. The apparatus of claim 7 in which there is provided a five-faced transparent prism, said prism being located in said rotor hole to plug the same for the purpose of reflecting said beam of light into said photoelectric pickoff, said pickoff translating into electrical signals the movements of said rotor about the two principal axes normal to said spin axis.

9. The apparatus of claim 5 in which said rotor is made of nonmagnetic material and includes a magnetic body which comprises the armature of an electromagnetic pickoff, said pickoff also comprising a stator, and an electrical circuit, said circuit translating the gyroscopic movement of said rotor into an electrical signal.

10. The apparatus of claim 2 in which said rotor has a free flat face perpendicular to said spin axis when said rotor is not subjected to forces other than the ones generated by said spin, said free face having its central area formed into a mirror of any appropriate shape for the purpose of reflecting a light beam.

11. The apparatus of claim 2 in which there is provided a light source, said shaft having a central hole along its axis, and said rotor also having a hole that is an extension of said shaft hole, for the purpose of allowing the unobstructed passage of a beam of light from said light source.

12. The apparatus of claim 11 in which there is provided a five-faced transparent prism and a photoelectric pickoff, said prism being located in said rotor hole to plug the same for the purpose of reflecting said beam of light into said photoelectric pickoff, said pickoff translating into electrical signals the movements of said rotor about the two principal axes normal to said spin axis.

13. The apparatus of claim 2 in which said rotor is made of nonmagnetic material and includes a magnetic body which comprises the armature of an electromagnetic pickoff, said pickoff also comprising a stator, and an electrical circuit, said circuit translating the gyroscopic movement of said rotor into an electrical signal.

14. The apparatus of claim 2 including two electromagnets fastened on said head, the poles of said electromagnets lying in a plane containing said spin axis and being normal to said torsion spring axis, said poles facing the outer surface of said rotor in a close proximity, said rotor being equipped with two magnetic armatures imbedded under said rotor's outer surface, said poles being supplied by electric coils, said coils being fed with electric currents, said electromagnets applying force couples upon said armatures in response to said currents, said force couples generating a torque about said torsion spring axis.

15. The apparatus of claim 14 further characterized by said rotor having a free flat face, the central area of said free flat face formed into a mirror for the purpose of reflecting a light beam.

16. The apparatus of claim 14 further characterized in that there is provided a light source and by the presence of a central hole along the axis of said shaft and by the presence of a similar hole in said rotor for the purpose of allowing the unobstructed passage of a beam of light from said light source.

17. The apparatus of claim 16 further characterized by the presence of a five-faced transparent prism and a photoelectric pickoff, said prism plugging the end of said rotor hole for the purpose of reflecting said beam of light into said photoelectric pickoff, said pickoff translating into electrical signals the movements of said rotor.

18. Apparatus responsive to angular movement, said apparatus comprising a stationary head enclosing a rotor, said rotor being carried by a shaft, means for spinning said shaft at a high angular speed about a spin axis, said rotor being mounted on said shaft through resilient means for oscillatory movement with respect to said head about an oscillation axis orthogonal to said spin axis upon occurrence of relative angular movement of said apparatus about an axis normal to said spin axis, said resilient means connecting said rotor to said shaft, said rotor having one of its three principal axes of inertia aligned with said spin axis and a second of said principal axes aligned with said oscillatory axis, said rotor being purposely shaped to exhibit equal moments of inertia about at least two of said principal axes, said two axes being both orthogonal to said oscillation axis.

19. Apparatus responsive to angular movement, said apparatus comprising a stationary head enclosing a rotor, said rotor being carried by a shaft, means for spinning said shaft at a high angular speed about a spin axis, said rotor being mounted on said shaft for oscillatory movement with respect to said head about an oscillation axis orthogonal to said spin axis upon occurrence of relative angular movement of said apparatus about an axis normal to said spin axis, said resilient means connecting said rotor to said shaft, said rotor having one of its three principal axes of inertia aligned with said spin axis and a second of said principal axes aligned with said oscillatory axis, said rotor being purposely shaped to exhibit equal moments of inertia about all three said principal axes.

20. The apparatus of claim 19 including a viscous fluid filling the space between said head and said rotor, four pairs of strain gages with each pair comprising two similar gages placed end to end in a direction parallel to said spin axis in the space between said rotor and said head, said pairs being rigidly affixed on the inner surface of said head, said gages being free to contract and expand longitudinally under the influence of the viscous forces of said fluid, two consecutive such pairs being placed ninety degrees apart, two diametrically opposite pairs being interconnected into an electrical bridge.

21. The apparatus of claim 19 including radial fins placed on said rotor, a viscous fluid filling said head, said fins impelling said fluid toward the inner periphery of said head, four hydraulic chambers placed symmetrically about the outer periphery of said head, each chamber being connected to said head through a pair of ducts arranged on a line parallel to said spin axis, each of said chambers being partitioned into two sub-chambers by means of a resilient diaphragm, a pair of piezoelectric gages centrally located on each side of said diaphragm, said gages of two diametrically opposite sub-chambers being connected into an electrical bridge, said rotor changing the area of said ducts differentially and in linear relationship to said rotor's gyroscopic deflection, said change of the duct area generating a pressure differential over said resilient diaphragm.

22. Apparatus for measuring angular motion, said apparatus comprising a rotatable liquid-tight head, means for rotating said head at a high speed, a solid rotor carried by said head, said rotor mounted on said head through resilient means allowing oscillatory motion of said rotor relative to said head about an oscillation axis, said rotor having equal moments of inertia about at least the two principal axes normal to one another and to said oscillation axis, said resilient means resisting but not impeding gyroscopically induced movements of said rotor relative to said head, means for generating viscous damping effects on said rotor, optical means for transducing said gyroscopically induced movements of said rotor into electric signals, and means for aplying electromagnetic feedback torques upon said rotor affixed and rotating with said head.

23. Apparatus for measuring angular motion, said apparatus comprising a rotatable liquid-tight head, means for rotating said head at a high speed, a solid rotor carried by said head, said rotor mounted on said head through resilient means allowing oscillatory motion of said rotor relative to said head about an oscillation axis, said rotor having equal moments of inertia about at least the two principal axes normal to one another and to said oscillation axis, said resilient means resisting but not impeding gyroscopically induced movements of said rotor relative to said head, means for generating viscous damping effects on said rotor, variable electromagnetic reluctance means for transducing said gyroscopically induced movements of said rotor into electric signals, and means for applying electromagnetic feedback torques upon said rotor affixed to and rotating with said rotor.

24. Apparatus for measuring angular motion, said apparatus comprising a rotatable liquid-tight head, means for rotating said head at a high speed, a solid rotor carried by said head, said rotor mounted on said head through resilient means allowing oscillatory motion of said rotor relative to said head about an oscillation axis, said rotor having equal moments of inertia about at least the two principal axes normal to one another and to said oscillation axis, said resilient means resisting but not impeding gyroscopically induced movements of said rotor relative to said head, means for generating viscous damping effects on said rotor, piezoresistive means for transducing said gyroscopically induced movement of said rotor into electric signals, and means for applying electromagnetic feedback torques upon said rotor affixed to and rotating with said rotor.

25. Apparatus for measuring angular motion, said apparatus comprising a rotatable head, means for rotating said head at a high speed inside a liquid-tight stationary vessel, a solid rotor carried by said head, said rotor being mounted on said head through resilient means allowing oscillatory motion of said rotor relative to said head about an oscillation axis, said rotor having equal moments of inertia about at least the two principal axes normal to one another and to the oscillation axis, said resilient means resisting but not impeding gyroscopically induced movements of said rotor relative to said head, means for generating viscous damping effects upon said rotor, piezoresistive means affixed to said stationary vessel for transducing said induced gyroscopic movement of said rotor into electric signals, and means for applying electromagnetic feedback torques upon said rotor affixed to said stationary vessel.

26. Apparatus for measuring angular motion, said apparatus comprising a rotatable head, means for rotating said head at a high speed inside a liquid-tight stationary vessel, a solid rotor carried by said head, said rotor being mounted on said head through resilient means allowing oscillatory motion of said rotor relative to said head about an oscillation axis, said rotor having equal moments of inertia about at least the two principal axes normal to one another and to the oscillation axis, said resilient means resisting but not impeding gyroscopically induced movements of said rotor relative to said head, means for generating viscous damping effects upon said rotor, hydraulic pickoff means affixed to said stationary vessel for transducing said gyroscopically induced movements of said rotor into electric signals, and means for applying feedback torques upon said rotor affixed to said stationary vessel.

27. Apparatus responsive to angular movement, said apparatus comprising a rotatable head, means for spinning said head through a shaft at a high angular speed about a spin axis, a solid rotor carried on said head, said rotor being mounted for oscillatory movement with respect to said head through resilient means, said resilient means resisting but not impeding gyroscopically induced movements of said rotor with respect to said head about an oscillation axis orthogonal to said spin axis upon occurrence of relative angular movement of said apparatus about an axis normal to said spin axis, said rotor having one of its three principal axes of inertia aligned with said spin axis and a second of said principal axes aligned with said oscillation axis, said rotor being purposely shaped to exhibit equal moments of inertia about at least two of said principal axes, said two axes being both orthogonal to said oscillation axis.

28. Apparatus responsive to angular movement, said apparatus comprising a stationary head enclosing a rotor, said rotor being carried by a shaft, means for spinning said shaft at a high angular speed about a spin axis, said rotor being mounted on said shaft through resilient means for oscillatory movement with respect to said head about an oscillation axis orthogonal to said spin axis upon occurrence of relative angular movement of said apparatus about an axis normal to said spin axis, said rotor having one of its three principal axes of inertia aligned with said spin axis and a second of said principal axes aligned with said oscillatory axis, said rotor being purposely shaped to exhibit equal moments of inertia about two of said principal axes, said two axes being both orthogonal to said oscillation axis.

29. Apparatus responsive to angular movement, said apparatus comprising a solid rotor enclosed within a head, said rotor coupled to a shaft by means of a resilient link, said shaft being subjected to a high rate of spin about its own geometric axis which is also the spin axis, said rotor being shaped to exhibit equal moments of inertia about at least two principal axes, one of said two principal axes being the spin axis, said resilient link resisting but not impeding oscillatory movement of said rotor relative to said shaft upon occurrence of angular movement of said apparatus about an axis normal to said spin axis.

References Cited

UNITED STATES PATENTS

| | | | |
|---|---|---|---|
| 2,716,893 | 9/1955 | Birdsall | 74—5 |
| 2,951,376 | 9/1960 | Lahde | 74—5.6 |
| 2,995,938 | 8/1961 | Brodersen et al. | 74—5.7 |
| 3,142,183 | 7/1964 | Dane | 74—5.7 |
| 3,142,991 | 8/1964 | Pittman | 74—5.6 X |

FRED C. MATTERN, JR., *Primary Examiner.*

J. PUFFER, C. J. HUSAR, *Assistant Examiners.*